United States Patent [19]

Boos

[11] Patent Number: 4,637,760

[45] Date of Patent: Jan. 20, 1987

[54] APPARATUS FOR TRANSPORTING ARTICLES BY FLUID FLOW THROUGH A PIPE SYSTEM

[75] Inventor: Günther Boos, Markdorf, Fed. Rep. of Germany

[73] Assignee: Alfred Bolz GmbH & Co. KG, Wangen, Fed. Rep. of Germany

[21] Appl. No.: 663,759

[22] Filed: Oct. 22, 1984

[30] Foreign Application Priority Data

Oct. 28, 1983 [DE] Fed. Rep. of Germany ....... 3339362

[51] Int. Cl.$^4$ ........................ B65G 53/58; B65G 53/14
[52] U.S. Cl. .................................... 406/105; 406/153; 406/94
[58] Field of Search ................... 406/105, 153, 192, 94

[56] References Cited

U.S. PATENT DOCUMENTS

3,325,222  6/1967  Round et al. ........................ 406/105
3,751,297  8/1973  Minbiole, Jr. et al. ........... 406/94 X
4,240,768  12/1980  Carstens .......................... 406/192 X
4,451,184  5/1984  Mitchell .............................. 406/105

Primary Examiner—Jeffrey V. Nase
Assistant Examiner—L. E. Williams
Attorney, Agent, or Firm—Erwin S. Teltscher; Peter R. Ruzek

[57] ABSTRACT

Articles having a defined geometric shape are transported from a starting to an end location by fluid flowing through a pipe system. The articles also flow through at least one jet pump which is creating the flow. Guides for the articles are provided in the pipe and within the jet pump. The articles may be subjected to heat or pressure treatment during transport. To create a predetermined pressure in a particular pipe section, a second jet pump can be positioned at the end of the section and operates in the direction opposing the action of the pump at the starting end.

11 Claims, 12 Drawing Figures

APPARATUS FOR TRANSPORTING ARTICLES BY FLUID FLOW THROUGH A PIPE SYSTEM

FIELD OF THE INVENTION

The present invention relates to apparatus for transporting articles through a pipe by means of fluid pressure. More particularly, it concerns transport of articles having a definite geometric shape.

BACKGROUND OF THE INVENTION

Systems in which fine or course particles are transported through pipes by means of gaseous or liquid fluid are discussed, for example, in German Pat. No. 2,461,539 and British Pat. No. 633,779.

SUMMARY OF THE INVENTION

In contrast to the system described in the above mentioned German and British patents, it is the object of the present invention to furnish a system wherein the transport of larger articles, namely articles have a defined geometric form, is possible. Further, the apparatus is to operate automatically or semi-automatically and must allow the articles to be subjected to heat or pressure treatment while being transported from a starting to an end location. For example, it is desired that plastic articles can undergo a polymerization process during the transport time.

In accordance with the present invention, the articles are transported from a starting to an end location through the pipe system by means of a jet pump connected to the pipe system at the starting location. The jet pump has a suction chamber which has an article inlet through which articles and their transport fluid are admitted to the suction chamber. Drive fluid enters through a jet nozzle into the suction chamber and propels the articles with the transport fluid through a mixing outlet towards a diffuser. The end of the diffuser has a transport fluid outlet connected to the pipe system. The transport velocity and pressure are controlled by regulating apparatus, e.g. pump and regulating valve, connected between a drive fluid outlet of the diffuser and the jet nozzle. Guide members which guide the articles from the outlet of the suction chamber through the diffuser have openings which allow fluid to pass through. Apparatus substituting hot water or steam for the drive and transport fluids is provided at an intermediate location in the pipe system. Alternatively, heating may be applied to the articles by applying steam or hot water in a casing around the pipe. Generally, a cooling phase follows the heating phase before the transport fluid is separated and the articles are delivered to the end location.

The speed with which the articles pass through the pipe system may be changed or the articles may have different velocities in different pipe sections.

The novel features which are considered as characteristic for the invention are set forth in particular in the appended claims. The invention itself, however, both as to its construction and its method of operation, together with additional objects and advantages thereof will best be understood from the following description of specific embodiments when read in connection with the accompanying drawing.

BRIEF DESCRIPTION OF THE DRAWING

FIG. 7b is a cross-section through the jet pump illustrated in FIG. 7a;

DESCRIPTION OF THE PREFERRED EMBODIMENTS

Figure 1:
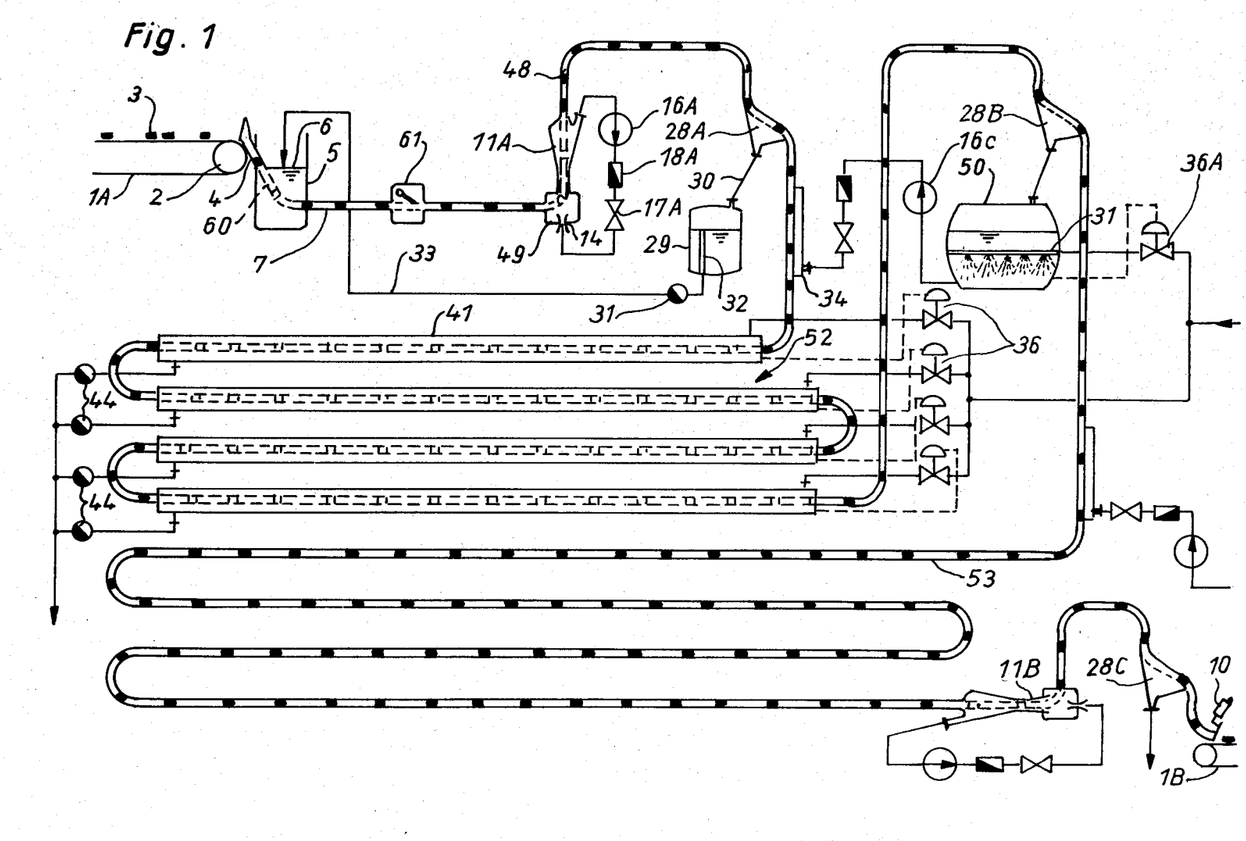
FIG. 1 is a schematic diagram illustrating an embodiment of the present invention which utilizes two jet pumps acting in opposition to one another.

As shown in FIG. 1, a conveyer belt 1A having a guide roller 2 carries the articles 3 to a slide 4 which terminates in a reservoir 5. An intake or suction pipe 7 having an opening 60 below the water level 6, of reservoir 5 receives the articles. Suction created by jet pump 11a creates a flow in intake pipe 7 which carries articles 3 via check valve 61 through jet pump 11A into transport pipe 48. As illustrated perhaps more clearly in FIG. 3, a pump 16A provides the drive fluid which reaches suction chamber 49 of the jet pump via jet nozzle 14. Pump 16A, a regulating valve 17A connected in series therewith, as well as flow meter 18A are connected in a line 47A which connects a drive fluid outlet of a diffuser 26 to jet nozzle 14. For a constant counterpressure, the amount of drive fluid in line 47A determines the amount of transport fluid sucked into a suction chamber 49. Alternatively, if the amount of transport fluid received in suction chamber 49 remains constant, the quantity of drive fluid determines the pressure build up in transport pipe 48. Since it is desired that both the transport velocity and the pressure in the transport pipe can be determined to suit particular applications, a second jet pump 11B is connected to the transport pipe at the location to which the articles are to be delivered. Pump 11B acts in the opposite direction, i.e. it creates a counterpressure. The drive fluid circuit for pump 11B is the same as that for pump 11A. A drive pump, a flow meter, and a regulating valve are connected to channel drive fluid from the output of a diffuser to the jet nozzle associated with jet pump 11B. If regulating valves 17A and 17B are operated so that a change in the quantity of fluid in pipe 47A is equal to the change in the quantity of fluid passing through pipe 47B, then the flow rate of the transport fluid remains constant. Only the pressure in pipe 48 changes.

Figure 3:
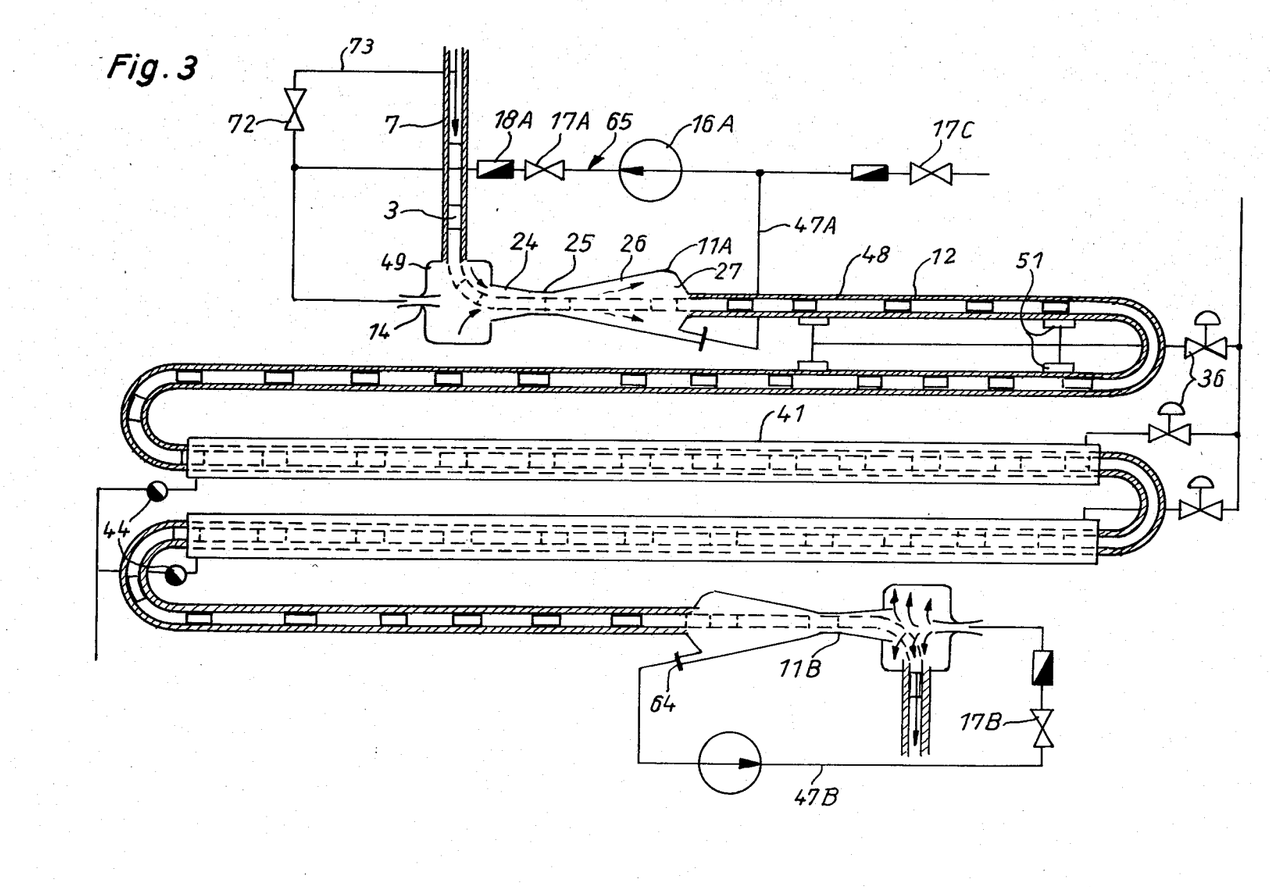
FIG. 3 is a schematic diagram illustrating the embodiment of FIG. 1, but with an additional pressure or suction line for changing the transport velocity.

Still referring to FIG. 3, a source of pressure or suction 66 is connected through a valve 17C and a flow meter to line 47A. When valve 17C is closed, the amount of fluid in pipe 47A remains constant, thereby keeping the amount of fluid transported between the first and second jet pump as well as the transport velocity of the articles constant. If valve 17C is open and drive fluid is removed from line 47A, less fluid flows in transport pipe 48 and the velocity of transport of the articles decreases correspondingly. On the other hand, if additional drive fluid is admitted to pipe 47A through valve 17C, the transport velocity increases.

Figure 8:
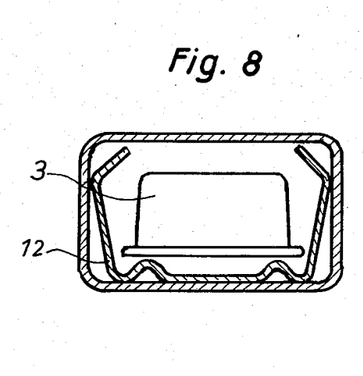
FIG. 8 is a cross-section of a pipe illustrating the guide members for the articles to be transported.
Figure 9:
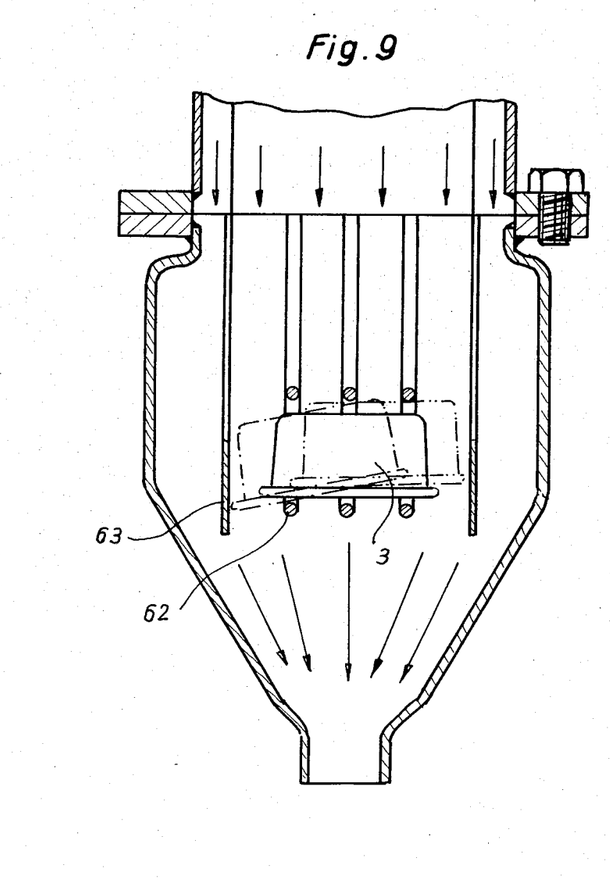
FIG. 9 is a section through the suction chamber of the jet pump with a guide consisting of a plurality of rods.

Jet pump 11A consists of the above mentioned suction chamber 49 having the jet nozzle 14 and, opposite thereto, an outlet of increasingly small cross-section which terminates in a cylindrical pipe section 25 communicating with a diffuser 26. At its outlet diffuser 26 has a transition piece 27 which terminates in transport pipe 48. A guide is provided for guiding the articles through sections 24, 25 and diffuser 26. As illustrated in FIGS. 8 and 9, such a guide 12 or 13 must be constructed so as to offer minimum interference to the formation of normal flow in the jet pump. Guide 13, illustrated in FIG. 9, constitutes a particularly low resistance to flow. It consists of rods 62 and/or bars 63 which are arranged so that they enclose the articles with play.

Referring to FIG. 1, check valve 61 is used to prevent a rapid drop of pressure in transport pipe 48 if, for example, pump 16A malfunctions. If the output of the jet pump decreases and the pump no longer exerts the required transport pressure, check valve 61 closes so that the pressure of the transport fluid is maintained. Even if the transport fluid is heated to a temperature in excess of 100° C., there is no danger of steam formation, since the heated transport fluid from heating stage 52 (to be discussed later) can no longer pass through a water separator 28A in the direction toward intake pipe 7.

As mentioned above, articles 3 reach transport pipe 48 via jet pump 11A and glide over an air cushion provided by water separator 28A. The transport fluid of this first stage passes through water separator 28A, a connecting duct 30 and into an equalizing tank 29. Equalizing tank 29 has an overflow 32 and a return pipe 33 connected to the overflow. Return pipe 33 terminates in reservoir 5. A drain with float 31 is provided in line 33 which allows the passage of excess water from equalizing tank 29, but is air tight. This allows the pressure in equalizing tank 29 to be maintained constant.

The second stage, a heating stage, starts at a fluid input connecting piece 34. Here the temperature of the transport fluid generally exceeds 100°C. This temperature is generated in a hot water tank 50 by direct injection of steam. A steam regulator valve 36A allows the addition of as much steam through a steam distributor 37 as is required to maintain the temperature which has been set. The hot fluid is taken from hot water tank 50 by means of a pump 16C and is applied to heating stage 52 at the above mentioned connecting piece 34.

In transport pipe 48, heat is absorbed by articles 3, causing the temperature of the transport fluid to decrease. To raise its temperature, distributor boxes 51 (FIG. 3) are used for injecting steam directly into pipe 48. Alternatively, heating of the transport fluid can be achieved by use of a casing 41 which surrounds pipe 48.

Steam is introduced into the casing by a pressure control valve 36. The transport fluid is heated through the walls of pipe 48 and, in turn, causes articles 3 to be heated. Any condensation product is removed by steam traps 44 and collected.

Articles 3 pass through heating stage 52 in which, for example, the contents of a package illustrated as article 3 may be sterilized. The hot transport fluid is separated by hot water separator 28B and is returned to a hot water tank 50. The next following stage may be a cooling stage in which substantially the same operating pressure exists as existed in heating stage 52. In this stage, articles 3 pass through cooling pipe 53 and the above mentioned jet pump 11B which generates a counter pressure. Thereafter, the articles pass through a quick shut off regulating valve 10, the transport fluid is removed at a water separator 28C, while the articles at the end of the pipe transport system reach a second conveyor belt 1B. The cooling fluid is returned to the cold water circulating stage.

Figure 2:
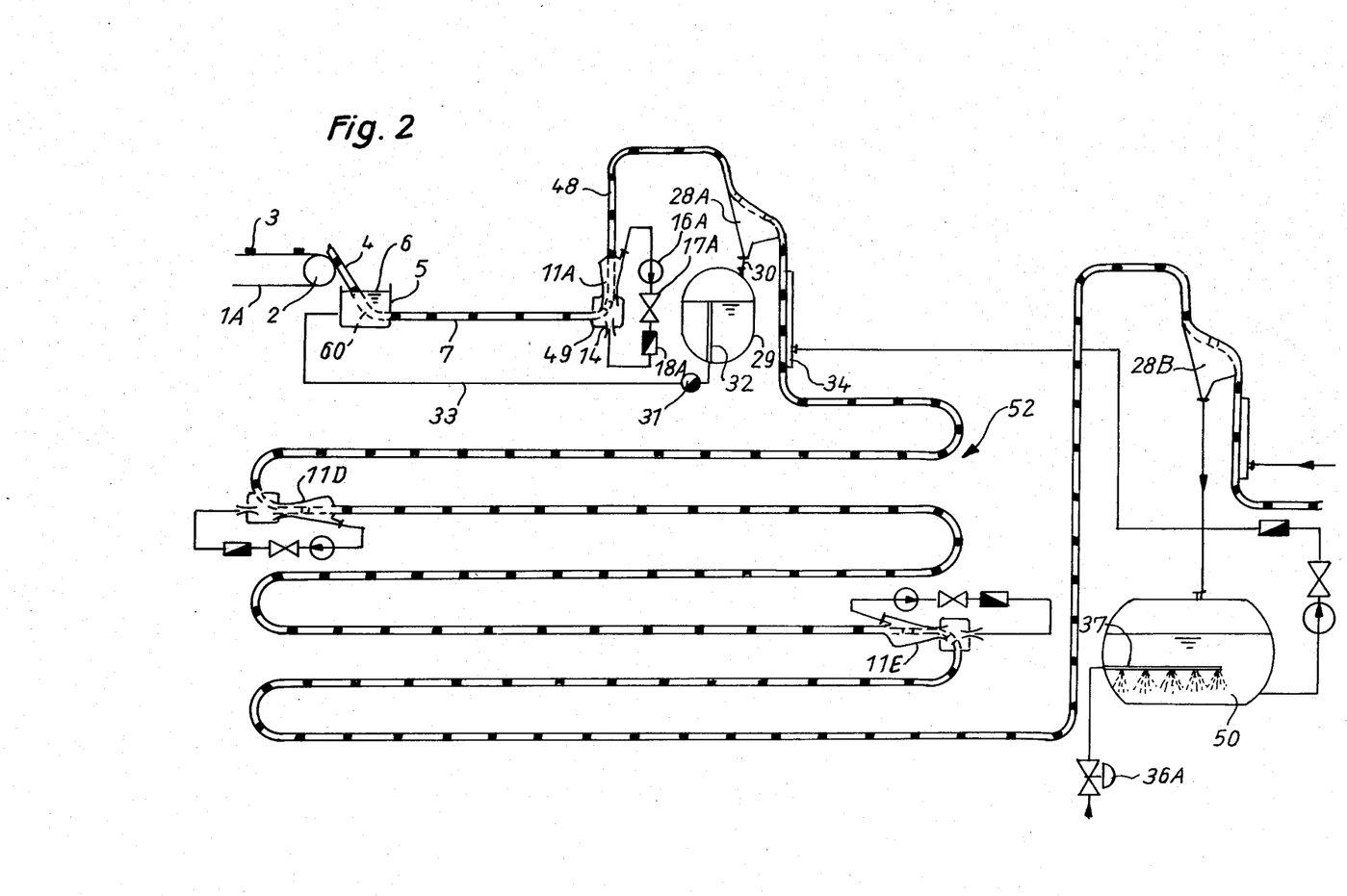
FIG. 2 is a schematic diagram illustrating use of two jet pumps acting in the same direction.

It should be noted that if it is desired that the pressure in different stages be substantially different, a plurality of jet pump pairs may be used. For example, as illustrated in FIG. 2, two jet pumps 11D and 11E acting in opposition to one another are arranged within heating stage 52. The pressure in this stage can therefore be adjusted within very wide limits, independent of the operating pressure in the other stages.

In the embodiments illustrated in FIGS. 1 and 2, jet pump 11A not only has the function of moving the transport fluid and articles 3 and establishing the desired operating pressure, but must also seal the parts of pipe 48 which are under pressure relative to the pressure in intake pipe 7 or against atmospheric pressure. If the system is utilized for thermal treatment of small articles or objects, which require a relatively small cross section of pipe 48, the inertia of the transport fluid is sufficient to effect this sealing. However, the larger the cross section of the pipe, the greater the difficulty in creating such a seal.

Figure 4:
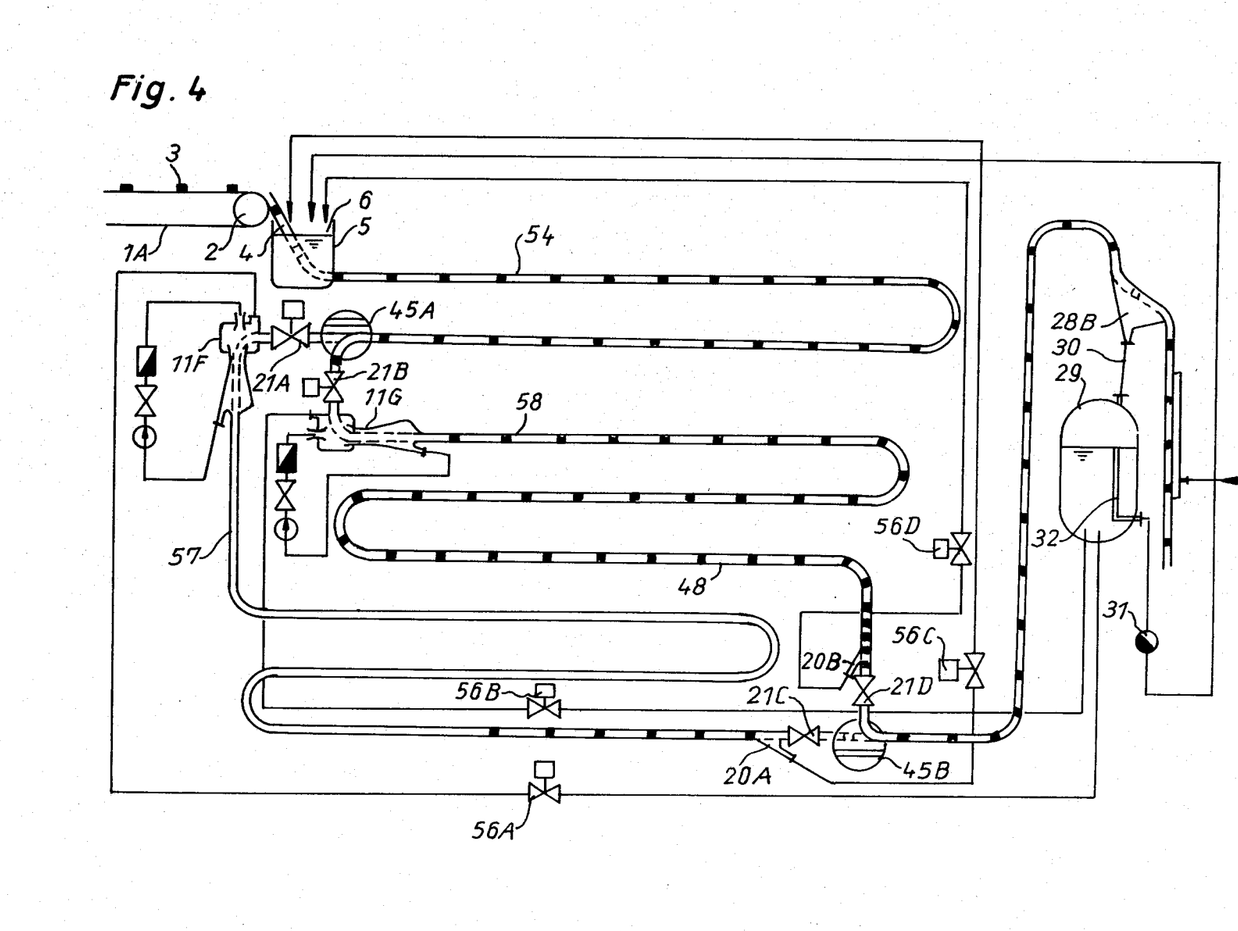
FIG. 4 is a schematic diagram illustrating the embodiment utilizing two jet pumps and associated pipe sections for alternately receiving articles and transport fluid.

These difficulties are overcome by the embodiment illustrated in FIG. 4. The embodiment of FIG. 4 allows relatively large articles to be transported from a pipe 54 which is under atmospheric pressure into a pipe section which is under a higher operating pressure without use of a standard lock as, for example, a bucket wheel in which the rotating parts carry out the sealing function. In this embodiment, the articles 3 are introduced through a routing switch 45A which ultimately causes the articles 3 to enter into substantially equally long transport pipe sections 57 and 58. In FIG. 4, pipe section 58 which is connected to a jet pump 11G is illustrated in the position in which it is receiving articles 3. Articles 3 are carried by the transport fluid to a closed quick acting slide valve 21D. An outlet connection 20B is arranged before slide valve 21D. The transport fluid is removed and flows back to reservoir 5 through an automatically opened valve 56D. The transport fluid is then sucked from reservoir 5 by jet pump 11G. The circuit for the transport fluid thus starts at reservoir 5, continues through pipe 54, routing switch 45A, open slide valve 21B, jet pump 11G, pipe section 58, outlet connection 20B, open valve 56D and back to reservoir 5.

At the same time as the above cycle takes place in pipe 58, pipe section 57 is emptied. While the emptying takes place, a quick acting slide valve 21A is closed. Valve 21A thus seals pipe section 57 which is under pressure against atmospheric pressure and the transport pressure existing in pipe 54. Jet pump 11F then sucks transport fluid from equalizing tank 29 and pumps the fluid together with articles 3 out of pipe section 57 through water separator 28B into the next stage which, for example, may be a heating stage. During this process, quick opening valve 21C and valve 56A are open, while valve 56C must be closed so that the pressure is maintained. A routing switch 45B is in a position connecting open valve 21C to the pipe section leading to water separator 28B.

After the process of discharging pipe section 57 has ended, as either computed or indicated by sensors, quick acting valve 21C and valve 56A close so that pipe section 57 is separated from the pressurized part of the pipe system.

The time in which pipe section 57 is discharged is equal to the time required to load pipe section 58, so that both of these processes terminate at the same time. Quick acting valve 21B closes, routing switches 45A and 45B pivot by, for example, 180°, thus opening the alternate routes. Quick acting valves 21A and 21D then open, as do automatically controlled valves 56B and 56C, which cause pipe section 57 to be reloaded, while pipe section 58 is discharged.

Figure 5:
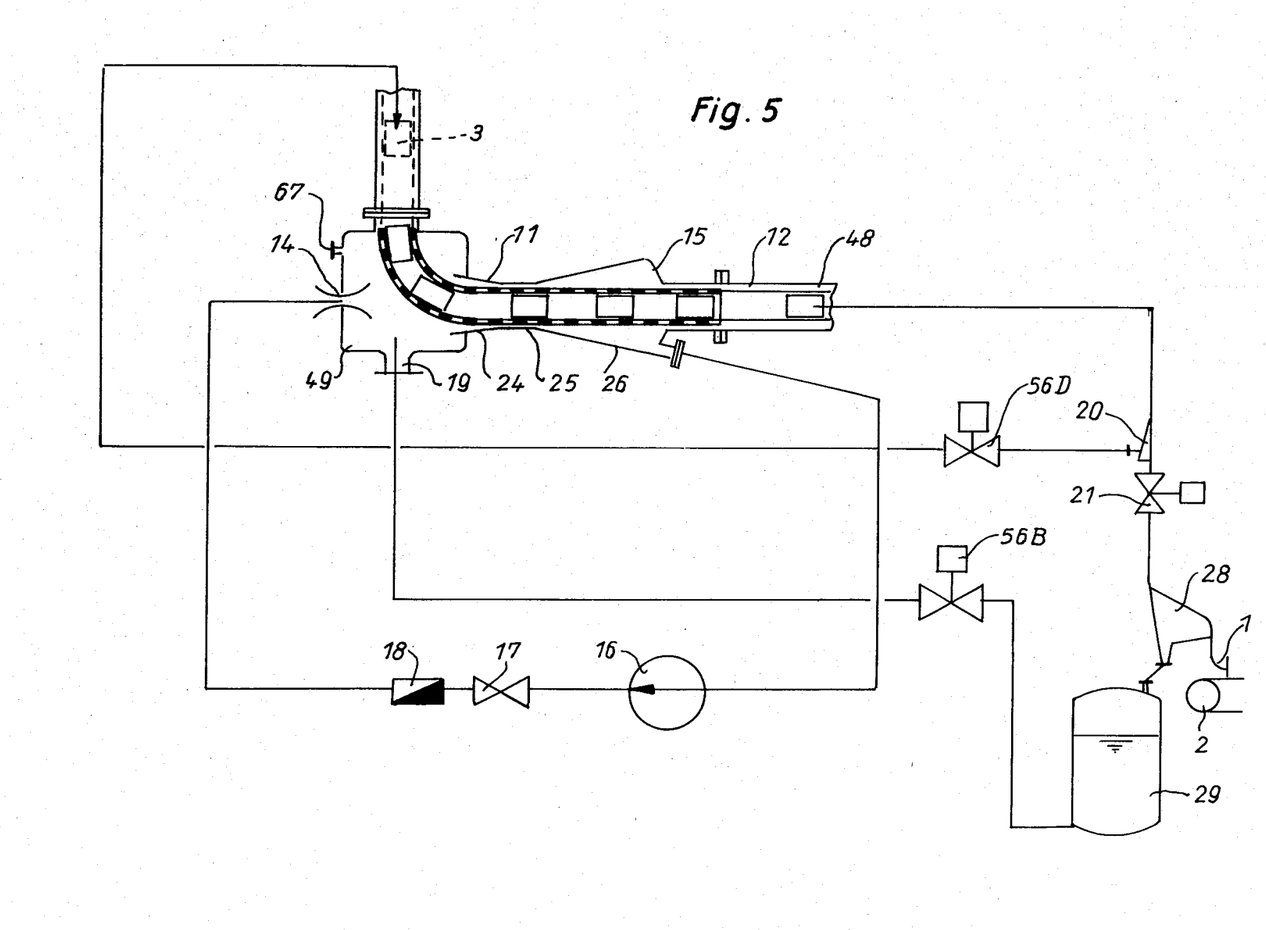
FIG. 5 is a schematic diagram illustrating a jet pump feeding back fluid from the diffuser output to the jet nozzle.

Since the loading and unloading processes take place relatively rapidly, this type of introduction of the articles 3 is very efficient. However, a specialized jet pump such as the one illustrated in FIG. 5 is required for its implementation. The pump illustrated in FIG. 5 differs from that in FIG. 3 in that the suction chamber has a further water admitting connector 19 through which transport fluid is sucked when valve 56D is closed and valve 56B is open. This corresponds to the cycle in which the system of FIG. 4 is causing pipe section 58 to be discharged, i.e. valve 21D is open and valve 21B is closed.

The location of connector 19 is so chosen that the drive fluid emanating from nozzle 14 mixes well with the fluid entering through connector 19. A further connector 67 may be provided so that an air tank may be connected to the apparatus.

Figure 6:
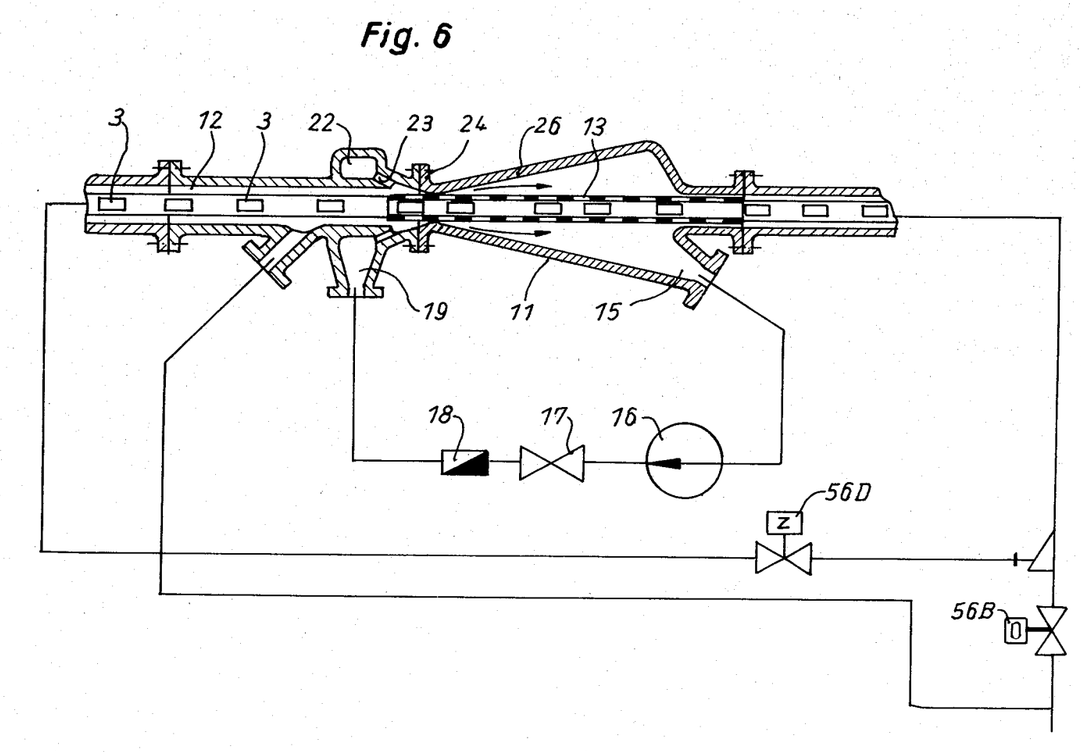
FIG. 6 is a schematic diagram illustrating guide a jet pump in a straight pipe section.

In the embodiment illustrated in FIG. 6, jet pump 11 is built into a straight line portion of the transport pipe. Here, the drive fluid is pumped by pump 16 enters a ring channel 22, which is arranged around guide 12 for articles 3. Instead of a single jet nozzle 14, as was the case in the embodiment of FIG. 5, a number of smaller jet nozzles are used which are arranged around the transport pipe in a ring shaped or rectangular arrangement, depending upon the cross sectional shape of the transport pipe. The drive fluid mixes with the transport fluid in a chamber 24. Guide 12 for articles 3 has an open construction in the region where chamber 24 narrows, as does guide 13 in the region of diffuser 26. This allows the fluid flow to take place freely in accordance with the operation of the jet pump.

Figure 7A:
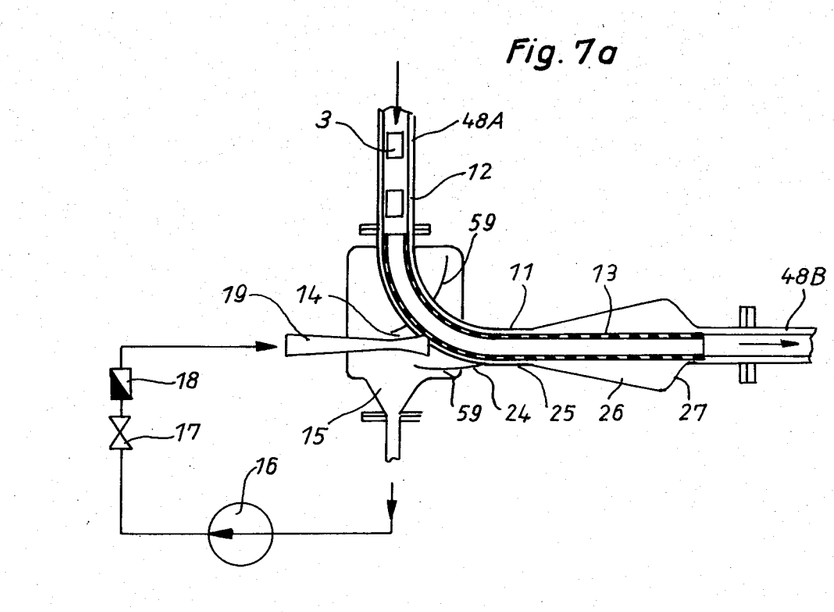
FIG. 7a is a schematic diagram illustrating a jet pump feeding fluid back from the suction chamber to the jet nozzle.
Figure 7B:
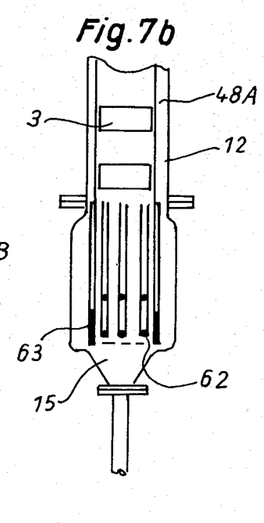

In the embodiment listed in FIG. 7a and 7b, the flow of the transport fluid inside of transport pipe 48A is not generated solely by the force of jet nozzle 14, but is due in equal measure to the discharge flow through an outlet terminating a necked-down portion 15' of the suction chamber of the pump. The necked-down portion is arranged at a location at which the discharge flow encounters the smallest possible resistance from the flow from jet nozzle 14. Deflecting plates 59 in the suction chamber increase the effectiveness of nozzle 14 by deflecting a part of the sucked in transport fluid in the direction of flow of the drive fluid.

FIG. 8 illustrates a guide 12 for articles 3 suitable for use when the transport pipe has a rectangular cross-section. The guide is made of a sheetmetal strip which is bent to a substantially U-shaped profile, two raised portions on the bottom allowing the articles to glide along with minimal resistance. As mentioned above, the guide illustrated in FIG. 9 is particularly suitable for use within the jet pump and consists of parallel rods 62 or bars 63 spaced apart from one another around the articles being guided. This arrangement offers a minimal resistance to fluid flow.

Figure 10:
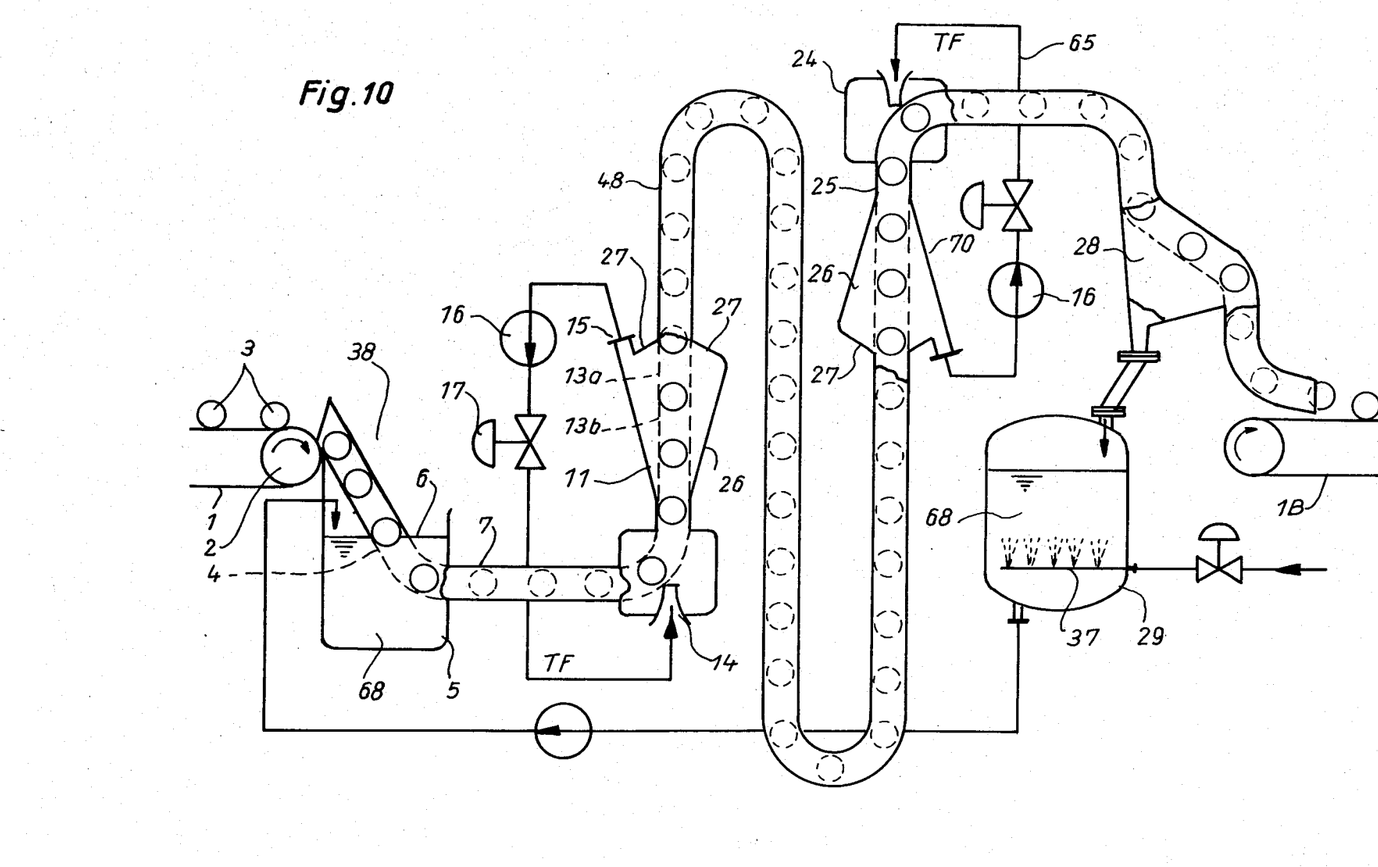
FIG. 10 illustrates a pipe section with two pumps acting in opposition to each other.

FIG. 10 illustrates a variation of the system illustrated in FIG. 1. Corresponding elements in the two figures have the same reference numerals. As in FIG. 1, articles 3 pass from conveyor belt 1 to slide 4, and from slide 4 enter suction pipe 7. From suction pipe 7 they pass into the suction chamber of a jet pump 11 of the Venturi type which has a diffuser 26 having an outlet through which the transport fluid with the articles is ejected and a second opening, 15, from which drive fluid is pumped by a pump 16, controlled by regulating valve 17 and applied to jet nozzle 14 of pump 11. Articles and transport fluid ejected from diffuser 26 pass into a pipe 48. Since for the embodiment of FIG. 10, it is desired to keep the pressure in pipe 48 constant, a second jet pump 70 is provided which acts in a direction creating a counter pressure to that created by pump 11. Pump 70 also has a diffuser outlet from which a pump 16 drives drive fluid into the jet nozzle of pump 70. Since pump 70 acts in the opposite sense to the direction of flow of the articles, the articles leave the suction chamber and progress towards a water separator 28. The water separated by water separator 28 passes into a tank 29, from which being returned to reservoir 5. This arrangement allows a constant pressure and a constant transport velocity to be maintained in pipe section 48 between pumps 1 and 70, the pressure exerted by pump 11 of course being greater than that exerted by pump 70.

Thermal treatment of the articles in the embodiment illustrated in FIG. 10 takes place under pressure at a temperature below the vaporization temperature. As illustrated, the transport fluid is heated by direct injection of steam into tank 29 by mens of distributors 37.

Figure 11:
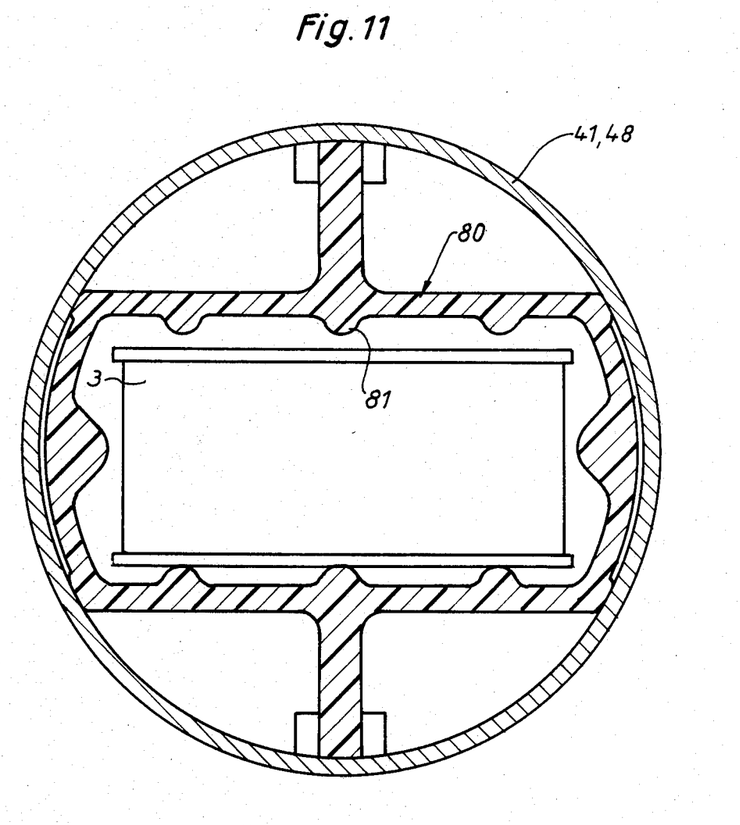
FIG. 11 is a pipe section with a built-in guide.

The guide illustrated in FIG. 11, guide 80, is suitable for use in the transport pipes 48 of FIG. 10. Guide 80 has a completely closed portion enclosing article 3 and two legs extending towards the inner surface of pipe 48 which allow anchoring of the guide in the pipe. The inner surface of the portion enclosing article 3 has longitudinal ribs 81, the distance between the inner most point of the ribs on opposite faces of the guide exceeding the dimension of the article in that direction. Guide 80 is made of a plastic having a particularly low sliding resistance.

While the invention has been illustrated in preferred embodiments, it is not to be limited to the circuits and structures shown, since many variations thereof will be evident to one skilled in the art and are intended to be encompassed in the present invention as set forth in the following claims.

I claim:

1. Apparatus for transporting articles having a determined geometric shape from a starting location to an end location by fluid flowing through a pipe system, particularly packages containing said articles, and wherein said articles are treated during their transport, comprising in combination first jet pump means of the Venturi type at a first location, said jet pump means including a suction chamber having a jet nozzle, an article inlet and a mixing outlet, diffusing means having an intake end of a predetermined cross-sectional area connected to said suction chamber, and a diffuser end having a drive fluid outlet of a certain cross-sectional area, and a transport fluid outlet, said predetermined cross-sectional area of said diffuser intake end widening in a generally hourglass and smooth manner devoid of any sharp transitions to said certain cross-sectional area of said diffuser end, said first jet pump means further including feed-back means for connecting said drive fluid outlet to said jet nozzle, pumping means downstream of said drive fluid outlet, and regulating valve means downstream of said pumping means for connecting said drive fluid outlet to said jet nozzle, so that at least a portion of the drive fluid passing through said drive fluid outlet is returned to said diffuser means through said suction chamber, guide means for guiding said articles from said mixing outlet through said diffusing means, said guide means including parallel bars spaced from one another so as to guide the articles therebetween at minimal resistance to fluid flow, transport pipe means connected to said transport fluid outlet of said diffuser end, and extending to a second location, injector means for injecting said drive fluid into said transport pipe means under pressure, at least one additional jet pump means acting in opposition to said first jet pump means, so as to facilitate control of the pressure in said transport pipe means, and suction pipe means for carrying said articles to said article inlet of said first jet pump means.

2. Apparatus as set forth in claim 1, further comprising means connected to said connecting means for changing the velocity of said transport fluid.

3. Apparatus as set forth in claim 2, wherein said velocity changing means comprises means for changing the quantity of said drive fluid in said connecting means.

4. Apparatus as set forth in claim 1, further comprising heating means for heating articles passing through a predetermined section of said transport pipe means.

5. Apparatus as set forth in claim 1, wherein said suction chamber further has a connecting piece for connecting to an air tank.

6. Apparatus as set forth in claim 1, further comprising transport fluid separating means near said second location;
wherein said suction chamber further has an additional opening having approximately said predetermined cross sectional area; and
further comprising means for connecting said transport fluid separating means to said additional opening of said suction chamber.

7. Apparatus for transporting articles having a determined geometric shape from a starting location to an end location by fluid flowing through a pipe system, comprising in combination first jet pump means of the Venturi type at a first location, said first jet pump means including a suction chamber of a prearranged cross-sectional area and having a jet nozzle, an article inlet and a mixing outlet, diffusing means having an intake end connected to said suction chamber, said intake end having a predetermined cross-sectional area smaller than said prearranged cross-sectional area of said suction chamber, and a diffuser end of a certain cross-sectional area wider than said predetermined cross-sectional area, which has a drive fluid outlet for passing drive fluid therethough, and a transport fluid outlet, said predetermined cross-sectional area of said diffuser intake end widening in a generally hourglass and smooth manner devoid of any sharp transitions to said certain cross-sectional area of said diffuser end, said first jet pump means further including feed-back means for connecting said drive fluid outlet to said jet nozzle, pumping means downstream of said drive fluid outlet, and regulating valve means downstream of said pumping means for connecting said drive fluid outlet to said jet nozzle, so that at least a portion of the drive fluid passing through said drive fluid outlet is returned to said diffuser means through said suction chamber, transport pipe means connected to said transport fluid outlet of said diffuser end, and extending to a second location, guide means for guiding said articles from said mixing outlet through at least one of said diffusing means and said transport pipe means to a second location, at least one additional jet pump means arranged at a predetermined distance along said transport pipe means for creating a counter pressure on said transport fluid so as to facilitate control of pressure in said transport pipe means, and suction pipe means for carrying said articles to said article inlet of said first jet pump means.

8. Apparatus as set forth in claim 7, wherein said guide means are located in said transport means, and include an article-enclosing portion formed with inwardly projecting longitudinal guide ribs on respective opposite inner sides of said article-enclosing portion, and anchoring means for anchoring said article-enclosing portion in said transport means.

9. Apparatus as set forth in claim 8, wherein said guide means is tubular, wherein said article-enclosing portion has a substantially rectangular inner cross-section defining an area about one half of a corresponding inner cross-sectional area of said tubular guide means, and wherein said anchoring means include two legs extending from respective outer longitudinal sides of said article-enclosing portion towards first inner peripheral portions of said tubular guide means, and outer sides of said article-enclosing portion transverse to the longitudinal sides thereof substantially conform to second inner peripheral portions of said tubular guide means, while being substantially spaced therefrom at respective gaps, and being angularly shifted by about ninety degree from said first inner peripheral portions, and further comprising holding means secured to an inner portion of said tubular guide means on respective opposite sides thereof for receiving outer end parts of said legs.

10. Apparatus as set forth in claim 7, wherein said guide means are located in said transport pipe means and are formed as a substantially U-shaped profile having two inwardly raised portions for permitting the articles to glide on said raised portions at minimal resistance to fluid flow.

11. Apparatus as set forth in claim 7, wherein said guide means are located in said diffusing means and include parallel bars spaced from one another, so as to guide the articles therebetween at minimal resistance to fluid flow.

* * * * *